(12) United States Patent
Song et al.

(10) Patent No.: US 9,019,565 B2
(45) Date of Patent: Apr. 28, 2015

(54) IMAGE SCANNING APPARATUS AND METHOD FOR IMAGE COMPENSATION

(71) Applicant: Samsung Electronics Co., Ltd., Suwon-si, Gyeonggi-do (KR)

(72) Inventors: Su-han Song, Seoul (KR); Hyung-soo Ohk, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/927,978

(22) Filed: Jun. 26, 2013

(65) Prior Publication Data

US 2014/0177004 A1    Jun. 26, 2014

(30) Foreign Application Priority Data

Dec. 24, 2012 (KR) .................. 10-2012-0152387

(51) Int. Cl.
*H04N 1/407* (2006.01)
*H04N 1/40* (2006.01)
*H04N 1/04* (2006.01)
*H04N 1/409* (2006.01)
*H04N 1/00* (2006.01)

(52) U.S. Cl.
CPC ........... *H04N 1/409* (2013.01); *H04N 1/00748* (2013.01); *H04N 1/00005* (2013.01); *H04N 1/00039* (2013.01)

(58) Field of Classification Search
USPC ............... 358/3.26, 3.27, 448, 488, 486, 449, 358/464, 466, 496, 474, 471, 497, 493, 1.9; 382/275, 257, 300, 293, 286, 263, 284, 382/285, 280, 288, 289, 290, 291, 294, 298, 382/318, 219, 220
See application file for complete search history.

(56) References Cited

U.S. PATENT DOCUMENTS

| | | | |
|---|---|---|---|
| 6,763,141 B2 | 7/2004 | Xu et al. | |
| 6,816,624 B1 | 11/2004 | Ebisawa et al. | |
| 7,016,081 B2 | 3/2006 | Araki et al. | |
| 7,072,527 B1* | 7/2006 | Nako | 382/290 |
| 7,430,065 B2 | 9/2008 | Arakai et al. | |
| 7,477,426 B2 | 1/2009 | Guan et al. | |
| 7,873,216 B2 | 1/2011 | Zandifar et al. | |
| 8,159,721 B2 | 4/2012 | Lee | |
| 8,270,044 B2 | 9/2012 | Seo | |
| 2005/0053304 A1* | 3/2005 | Frei | 382/257 |
| 2008/0100884 A1 | 5/2008 | Seo | |
| 2009/0141312 A1* | 6/2009 | Lee | 358/3.26 |
| 2010/0103474 A1 | 4/2010 | Oiwa et al. | |
| 2012/0300265 A1* | 11/2012 | Seo | 358/448 |

FOREIGN PATENT DOCUMENTS

| | | |
|---|---|---|
| JP | 2000-244729 | 9/2000 |
| KR | 10-2009-0057826 | 6/2009 |
| KR | 10-2012-0090879 | 8/2012 |

* cited by examiner

*Primary Examiner* — Ngon Nguyen
(74) *Attorney, Agent, or Firm* — Staas & Halsey LLP

(57) ABSTRACT

An image scanning apparatus and method are provided. The image scanning apparatus includes a scanner that scans a manuscript to generate a scan image, an image processor that calculates a manuscript boundary on the generated scan image as an equation and compensates a distortion of the scan image using the calculated equation, and a storage member that stores the scan image of which the distortion has been compensated.

24 Claims, 19 Drawing Sheets

FIG. 11A

Adjusting the red,

FIG. 11B

Adjusting the red,

IMAGE SCANNING APPARATUS AND METHOD FOR IMAGE COMPENSATION

CROSS-REFERENCE TO RELATED APPLICATIONS

This application is related to, and claims priority to, Korean Patent Application No. 10-2012-0152387, filed on Dec. 24, 2012, the disclosure of which is incorporated herein by reference.

BACKGROUND

1. Field

Exemplary embodiments of the present invention relate to an image scanning apparatus, a method for image compensation and a computer-readable recording medium, and more particularly, to an image scanning apparatus that may derive boundary information of a book in a mathematical formula to compensate a distortion occurring in a scanning or copying process of the book, method for image compensation and computer-readable recording medium.

2. Description of the Related Art

An image scanning apparatus is an apparatus that scans an original image such as a picture or film, etc. and converts the scanned image into digital data. The digital data may be displayed on a monitor of a computer or printed out by a printer and generated as an output image. Such an image scanning apparatus may be a scanner, copier, facsimile, or Multi Function Peripheral (MFP) that provides all the functions of a scanner, copier, facsimile, or Multi Function Peripheral.

A user uses such an image scanning apparatus to scan or copy a book, for example, and a spatially distorted area may occur or an area may appear to be darker than other areas in an image, due to a thick thickness of the book, which is a problem.

FIGS. 17 and 18 illustrate problems of a conventional image scanning apparatus.

With reference to FIGS. 17 and 18, a general image scanning apparatus 10 includes a stage glass 20 where documents may be placed and a scanning head 30 that reciprocates in a lower portion of the stage glass and scans the documents.

When a thick book is placed on the stage glass 20 and a scanning operation is performed as illustrated in FIG. 17, a proximity area of a folding line 180 may be separated a distance from a stage glass 20 compared to a page area 181, and accordingly, an image of the proximity area of the folding line 180 may be spatially distorted and appear to be darker than other areas.

Accordingly, a conventional image scanning apparatus may extract a boundary line of a book and compensate such a distorted area. A conventional image scanning apparatus may perform compensation based on a direction of a text or a boundary point of a book. However, problems exist in a difficulty in copying or scanning a book that does not include a text, and in compensating of a distortion based on a direction of a text or a perceived text.

In addition, a problem exists in extracting a boundary point of a book and compensating a distortion based thereon, in a significant amount of memory is required to store a boundary point, and when there is a difference of resolution between an image used when extracting a boundary point and an image for compensating the actual distortion, an error may occur at a boundary of the book.

SUMMARY

Additional aspects and/or advantages will be set forth in part in the description which follows and, in part, will be apparent from the description, or may be learned by practice of the invention.

According to an aspect of an exemplary embodiment of the present invention, an image scanning apparatus that may derive boundary information of a book in a mathematical formula to compensate for a distortion occurring in a scanning or copying process of the book, a method for image compensation, and a computer-readable recording medium having the method embedded therein are provided.

According to an exemplary embodiment of the present invention, an image scanning apparatus includes a scanner that scans a manuscript and generates a scan image, an image processor that calculates a manuscript boundary on the generated scan image as an equation, and compensates a distortion of the scan image using the calculated equation; and a storage member that stores the scan image of which its distortion has been compensated.

The image processor may include a boundary line determiner that detects a boundary between a document image area and circumference area within the generated scan image, an equation calculator that calculates an equation regarding the detected boundary, and a distortion compensator that compensates the distortion of the scan image using the calculated equation.

The boundary line determiner may detect a minimum boundary area comprising the document image using brightness information of the generated scan image, and detect the boundary within the detected minimum boundary area.

The boundary line determiner may extract a plurality of boundary candidate points located between the document image area and circumference area, and connect the extracted plurality of boundary candidate points to generate a boundary.

The boundary line determiner may search an error point using an adjacent boundary candidate point of among the plurality of boundary candidate points, and connect the plurality of boundary candidate points excluding the searched error point, to generate a boundary.

The image processor may comprise a reference point detector that detects a plurality of reference points located on the boundary.

The plurality of reference points may comprise a straight line point that is a vertex of the manuscript, a folding point located on a folding line of the manuscript, and a curve point located between the straight line point and folding point.

The reference point detector may analyze a format of the boundary to detect a point where the boundary gathers as a folding point, and detect a longest straight line of among the straight lines connecting the boundary, detect a point adjacent to the folding point on the detected straight line as a curve point, and detect a point most distanced from the folding point on the detected straight line as the straight line point.

The equation calculator may calculate a plurality of equations regarding one boundary that meets perpendicularly to the folding line crossing the scan image.

The equation calculator may calculate a one-dimensional equation that connects the straight line and curve point, and a multi-dimension equation that connects the one-dimensional equation, curve point, and folding point.

The multi-dimension equation may be a two-dimensional equation.

The distortion compensator may perform compensation regarding a distortion area defined by the calculated multi-dimension equation and the folding line crossing the scan image using the calculated multi-dimension equation.

The distortion compensator may perform compensation of removing the circumference area using the detected boundary.

The boundary line determiner may detect the folding line crossing the scan image, and the distortion compensator may separate the scan image of which its distortion has been compensated into a plurality of images based on the folding line.

The image scanning apparatus may include a controller that controls the scanner to generate a first scan image in a predetermined first resolution and a second scan image in a resolution higher than the first resolution, and controls the image processor to calculate an equation using the first scan image, and to compensate the second scan image using the calculated equation.

The scanner may comprise a stage glass where documents are accumulated; and a scanning head that reciprocates in a lower part of the stage glass and scans the image of the document.

An image scanning apparatus may include a scanner that scans a manuscript in a predetermined first resolution to generate a first scan image; an image processor that calculates a manuscript boundary on the generated first scan image as an equation; a controller that controls the scanner to scan the manuscript in a second resolution that is higher than the first resolution to generate a second scan image, and controls the image processor so that a distortion of the second scan image is compensated using the equation calculated through the first scan image; and a storage member that stores the second scan image of which the distortion has been compensated.

According to an exemplary embodiment of the present disclosure, an image compensation method of an image scanning apparatus may include scanning a manuscript to generate a scan image, calculating a manuscript boundary on the generated scan image as an equation, and compensating the distortion of the scan image using the calculated equation.

The calculating may comprise detecting a boundary between a document image area and a circumference area within the generated scan image, detecting a plurality of reference points located on the boundary, and calculating an equation regarding the detected boundary using the detected plurality of reference points.

The calculating may include detecting a minimum boundary area comprising a document image area using brightness information of the generated scan image; and the detecting the boundary detects the boundary within the detected minimum boundary area.

The plurality of reference points may include a straight line point that is a vertex of the manuscript, a folding point located on a folding line of the manuscript, and a curve point located between the straight line point and the folding point.

The calculating the equation may calculate a one-dimensional equation that connects the straight line point and the curve point and a multi-dimension equation that connects the curve point and folding point.

The compensating the distortion may perform compensation using the calculated multi-dimension equation, regarding a distortion area defined by the calculated multi-dimension equation and folding line crossing the scan image.

The compensating the distortion may perform compensation of removing the circumference area using the detected boundary.

The calculating may detect a folding line that crosses the scan image, and the compensating the distortion may separate the scan image of which the distortion has been compensated into a plurality of images based on the folding line.

According to an exemplary embodiment of the present disclosure, an image compensation method of an image scanning apparatus may include scanning a manuscript in a predetermined first resolution to generate a first scan image, calculating a manuscript boundary on the generated first scan image as an equation, scanning the manuscript in a second resolution which is higher than the first resolution to generate a second scan image, compensating a distortion of the second san image using the equation calculated through the first scan image; and storing the second scan image of which the distortion has been compensated.

According to an exemplary embodiment of the present disclosure, a computer readable record medium comprising a program for executing an image compensation method may include calculating a manuscript boundary on the generated scan image as an equation; and compensating a distortion of the scan image using the calculated equation.

BRIEF DESCRIPTION OF THE DRAWINGS

The above and/or other aspects of the present disclosure will be more apparent by describing certain present disclosure with reference to the accompanying drawings, in which:

FIGS. 11A and 11B illustrate a compensated image according to an exemplary embodiment of the present invention;

DETAILED DESCRIPTION

Certain exemplary embodiments are described in detail below with reference to the accompanying drawings.

Figure 1:
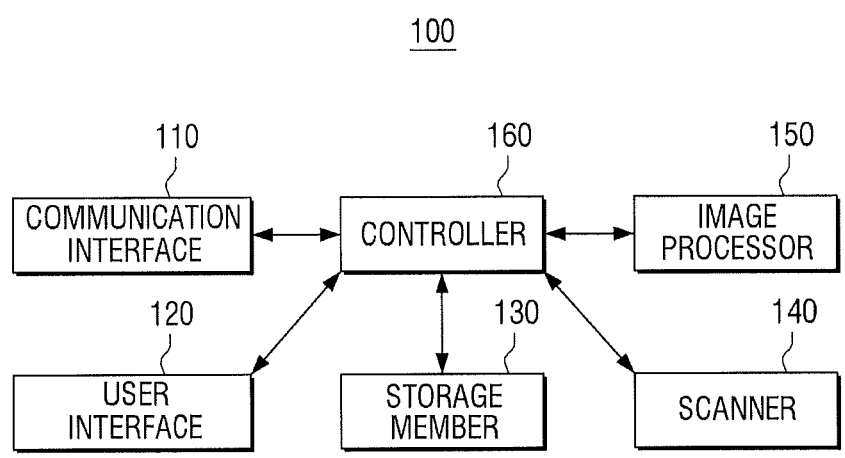
FIG. 1 illustrates an image scanning apparatus according to an exemplary embodiment of the present disclosure.

FIG. 1 illustrates an image scanning apparatus according to an exemplary embodiment of the present invention.

With reference to FIG. 1, the image scanning apparatus 100 includes a communicator 110, user interface 120, storage member 130, scanner 140, image processor 150 and controller 160. Such an image scanning apparatus 100 may be a scanner, copier, facsimile or a Multi Function Peripheral (MFP) etc. that provides more than one of, or all of, the functions of a scanner, copier, and facsimile.

The communication interface 110 may be connected to a host apparatus (not illustrated) such as a PC, notebook PC, PDA, and digital camera etc., and may transmit a data scanned in the image scanning apparatus 100 or a scan image of which the distortion has been compensated to the host apparatus (not illustrated). The communication interface 110 may be formed to connect the image scanning apparatus 100 to an external apparatus, or may be formed to be connected to a terminal apparatus through a Local Area Network (LAN) and internet, or may be formed to be connected through a USB (Universal Serial Bus) port.

The communication interface 110 may receive an input of a scan command. The interface 110 may receive a scan command or an image transmission command from a host apparatus.

The user interface 120 has a plurality of function keys that may determine or select various functions supported by the image scanning apparatus 100, and displays various information provided in the image scanning apparatus 100. The user interface 120 may be embodied as an apparatus that performs input and output at the same time such as a touch screen etc., or an apparatus where a mouse and monitor are combined.

The user interface 120 receives a scan command from a user. A user interface 120 may receive as an option whether to perform a distortion compensation regarding a book. The user interface 120 may receive a selecting whether to free-scan. The free-scan may be used when designating a scan area in a method of quickly scanning a manuscript with a low resolution before scanning the manuscript in a high resolution.

The user interface 120 may display the scanned image. The user interface 120 may display the scan image generated by the free-scan operation as a preview, and may display the scan image generated by the scan operation.

The storage member 130 may store the scan data scanned in the image scanning apparatus 100. The storage member 130 may store the scan image of which its distortion has been compensated in an image processor 150. The storage member 130 may temporarily store data (for example, boundary, boundary candidate point, reference point, equation) generated by an operation of the image processor 150.

The storage member 130 may be embodied as a storage medium within the image scanning apparatus 100 and external storage medium, for example a storage medium connected to a removable disk including a USB memory, a storage medium connected to a hose, and a web server through a network etc.

The scanner 140 scans a manuscript (for example, book) on a flatbed, and generates a scan image. The scanner 140 may include a scanning head 30 that reciprocates in a stage glass 20 and a lower portion of the stage glass where documents may be placed and scans the documents. The scanner 140 may include an automatic provision apparatus, and may scan the manuscript placed in the automatic provision apparatus and provided automatically.

The scanner 140 may scan the manuscript a plurality of times. The scanner 140 may quickly scan (free-scan) the manuscript in a low resolution (first resolution) to generate a first scan image of a low resolution, and perform a second scan on the manuscript in a high resolution after the free scan to generate a second scan image.

The image processor 150 calculates a value for a manuscript boundary on the generated scan image for use in an equation, and a value from the calculated equation to compensate the distortion of the scan image. An exemplary configuration and an exemplary operation of the image processor 150 is disclosed with reference to FIG. 2.

The image processor 150 performs image processing regarding the scanned image. The image processor 150 may perform distortion compensation, and perform image processing functions performed in a general image scanning apparatus 100.

The controller 160 may perform control on each configuration within the image scanning apparatus 100. When the controller 160 receives an input of a scan command from the user interface or communication interface 110, the controller 160 may control the scanner 140 so that a scan operation is performed, and may control the image processor 150 so that a distortion compensation may be performed on the scan image generated by the scan operation.

The controller 160 may control the storage member 130 so that the compensated scan image may be stored, and may control the communication interface 110 so that the stored scan image may be transmitted to the external terminal apparatus (or to a specific storage medium designated by the user). Although not illustrated, the controller 160 may enable printing of the scan image of which distortion has been compensated in a case of an MFP where the image scanning apparatus 100 may perform a printing operation.

Two-dimensional point information that expresses a boundary point of a book occupies a large volume of memory according to a size of the book, and the image scanning apparatus 100 according to the present invention may express this in a mathematical formula, which uses less memory. In applying a boundary point representative as a two-dimensional point to an image scanned in a different resolution, aliasing may occur on the boundary of the book due to the difference of resolution, and the image scanning apparatus 100 according to the present invention uses this as a mathematical formula, and thus it is possible to improve screen quality for an image scanned in different resolutions.

According to an exemplary embodiment, boundary detection and compensation regarding the manuscript may be performed by one scan operation, but it is also possible to calculate an equation regarding a boundary through a free scan operation, and apply the calculated equation to a second scanned image and perform compensation.

Figure 2:
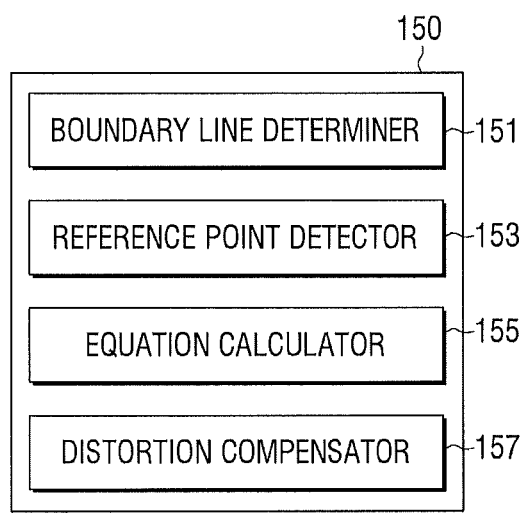
FIG. 2 illustrates an exemplary an image processor.

FIG. 2 illustrates an exemplary configuration of the image processor of FIG. 1.

With reference to FIG. 2, the image processor 150 may include a boundary line determiner 151, reference point detector 153, equation calculator 155 and distortion compensator 157.

The boundary line determiner 151 detects a boundary between a document image area and circumference area within the generated scan image. The boundary line determiner 151 may use brightness information of the scan image to detect a minimum boundary area that includes a document image. With such a detection of the minimum boundary area, it becomes possible to reduce a resource of the boundary detection operation. A document image area may be defined as a scan image area corresponding to the manuscript, and a circumference area may be defined as a scan image area regarding the stage glass where the manuscript does not exist.

The boundary line determiner 151 detects the boundary within the detected minimum boundary area. The boundary line determiner 151 uses a boundary track method to extract a plurality of boundary candidate points located between the document image area and circumference area.

The boundary line determiner 151 may compare the adjacent boundary candidate points, search error points of among the extracted plurality of boundary candidate points, and connect the plurality of boundary candidates except for the searched error points to generate boundaries.

The reference point detector 153 detects a plurality of reference points located on the boundary. The reference point detector 153 may analyze the format of the detected boundary and detect straight line points, folding points, and a plurality of reference points including straight line points.

The reference point detector 153 may analyze the format of the boundary to detect the point where the boundary gathers as the folding point, detect the longest straight line of among the straight lines that connect the boundary, detect the point most adjacent to the folding point on the longest straight line detected, and detect the point most distanced from the folding point on the longest straight line detected as the straight line point.

According to an exemplary embodiment, the boundary is provided from the boundary line determiner 151 and the reference point is detected, but it is also possible to detect the boundary candidate point that satisfies the above conditions of among the plurality of boundary candidate points detected in the boundary line determiner 151.

The equation calculator 155 calculates an equation regarding the detected boundary. The equation calculator 155 may calculate a plurality of equations regarding one boundary that meets perpendicularly to the folding line that crosses the scan image. The equation calculator 155 may calculate a first equation that connects the straight line point and curve point detected in the reference point detector 153 as a first equation, and calculate a second equation that connects the curve point and folding point.

A book has a rectangular format, and thus the aforementioned one-dimensional equation and two-dimensional equation may be generated for each top end boundary and bottom end boundary of the book. It is possible to calculate the one-dimensional equation regarding the first side of the book. A side of the book may be expressed as a straight line on the scan image, and thus the boundary on the side of the book may not be calculated as an equation.

According to an exemplary embodiment, the curve point and folding point may be calculated as a two-dimensional equation, but may be calculated as an equation of third-dimension or above. As the dimensions of the equation increase, the calculation volume may be more complicated, and thus in an exemplary embodiment, a two-dimensional equation may be used to calculate an equation that connects the curve point and folding point.

The distortion compensator 157 may use the calculated equation to compensate the distortion of the scan image. The distortion compensator 157 may perform compensation by brightness compensation and spatial distortion regarding the distorted area defined by the calculated multi-dimension equation and the folding line that crosses the scan image. The spatial distortion compensation regarding the distorted area is explained with reference to FIG. 10.

The distortion compensator 157 may perform compensation of removing the circumference area using the detected boundary.

The distortion compensator 157 may separate the scan image where distortion has been compensated with reference to the folding line into a plurality of images. The book includes two surfaces, and the distortion compensator 157 may separate the scan image for which the distortion has been compensated based on the folding line into left/right images, and may store the separated left/right images in the storage member 130 individually.

According to an exemplary embodiment, the distortion compensator 157 uses the scan image used in calculating the equation to compensate the distortion. It is possible to perform the distortion compensation using the image scanned in a resolution higher than the scan image used in calculating the equation.

An exemplary image processor is described with reference to FIGS. 3 to 10.

Figure 3:
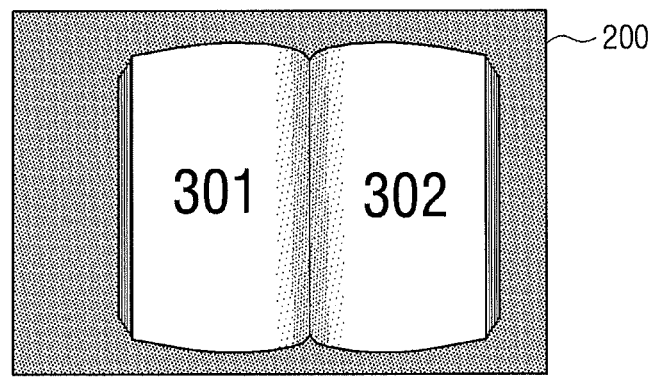
FIG. 3 illustrates an exemplary initially scanned image.

FIG. 3 illustrates an exemplary scanned image.

With reference to FIG. 3, the scanner 140 generates a scan image regarding the book placed on the stage glass. The generated scan image 200 includes an image regarding two surfaces 301, 302 of the book, and there may exist a darker area or a distortion in the folding line area by the thickness of the book.

To compensate the distortion of the folding line portion, it is necessary to determine an area where distortion occurs or how much distortion occurs. Accordingly, an exemplary embodiment of the present invention. detects t a boundary between the document image area and circumference area.

An exemplary boundary detection operation is described with reference to FIGS. 4 to 7.

FIGS. 4 to 7 illustrate a boundary detecting operation according to an exemplary embodiment.

When a boundary detection is performed for the entire scanned image, an inexact boundary may be detected by various noise (for example, noise from outside or lighting) located in the circumference area. The image scanning apparatus according to an exemplary embodiment predetermines the area (that is minimum boundary area) to perform boundary detection within the scan image.

Figure 4:
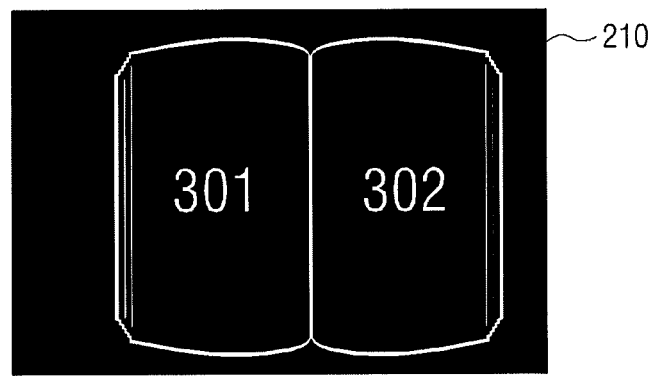
FIGS. 4 to 7 illustrate a boundary detecting operation according to the exemplary embodiment of the present invention.
Figure 5:
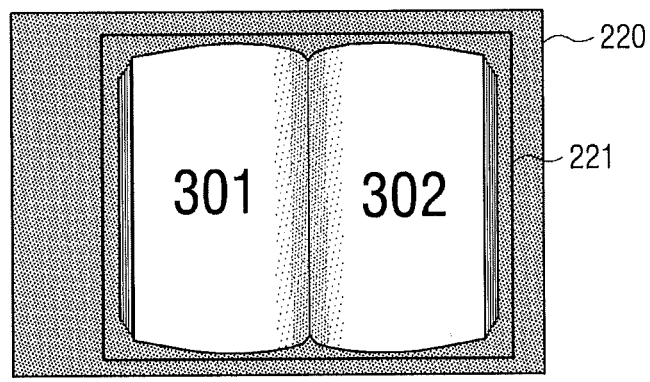
Figure 6:
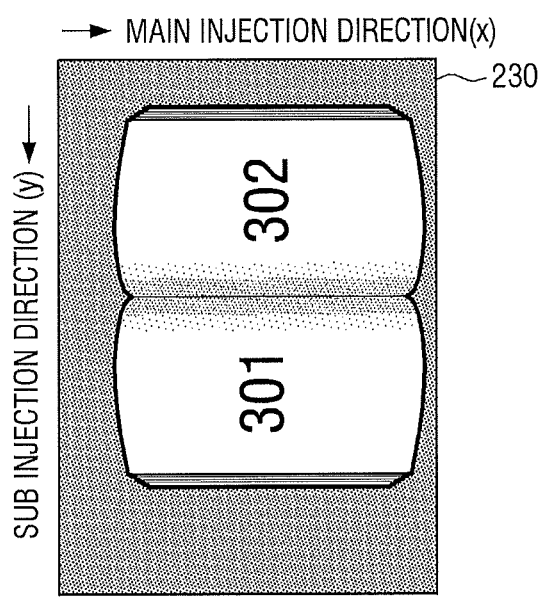

To predetermine such a minimum boundary area within a lamer boundary area, it is possible to extract brightness information regarding the scan image as illustrated in FIG. 4, and detect the minimum boundary area, for example, minimum boundary area 221, within the lamer boundary area 220, as in FIG. 5 using the extracted brightness information. Such a minimum boundary area may have a rectangular shape, and the minimum boundary area includes all document image areas.

For convenience of explanation, a main injection direction is referred to as a X coordinate direction, while a subinjection direction is referred to as a Y coordinate.

Figure 7:
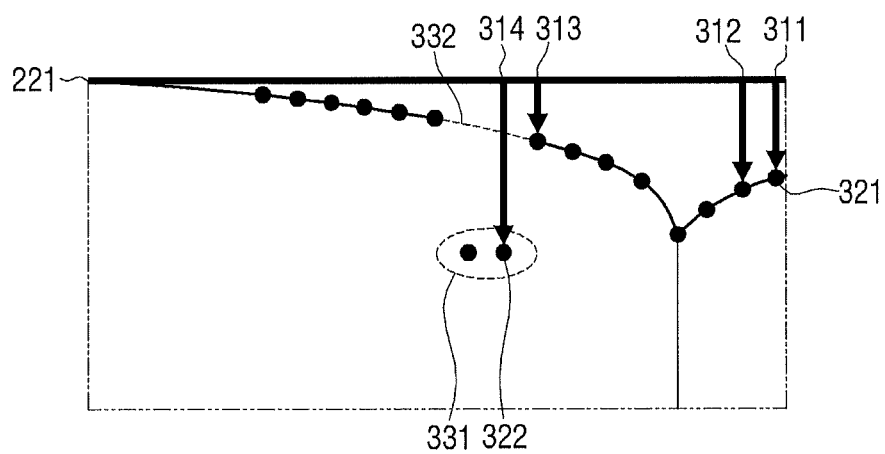

When the minimum boundary area is detected, as illustrated in FIG. 7, a boundary candidate point (321, 322, 331) between the document image area and the circumference area is extracted while moving towards a y direction (311>314) within the minimum boundary area by a certain distance. Such a boundary candidate point may be extracted using a brightness contrast, and thus when there exists a high contrast area within the document image area, the corresponding contrast area may be extracted as the boundary candidate point.

Therefore, the reference point detector 153 may mutually compare the adjacent boundary candidate points, detect the boundary candidate point (311, 322) (that is an error point) located within the document image area, and use the remaining plurality of candidate points and connection thereof 332 except for the error point of among the detected plurality of boundary candidate points to generate a boundary.

An exemplary operation of detecting a reference point using the detected boundary is described with reference to FIG. 8.

Figure 8:
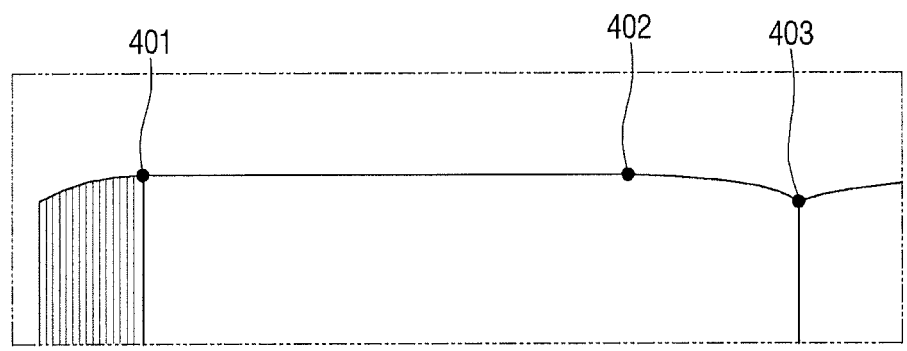
FIG. 8 illustrates an operation of detecting a reference point according the exemplary embodiment of the present invention.

With reference to FIG. 8, the reference point is a point that may represent an image, and may include a folding point 403, straight line point 401, and curve point 402. The folding point 403 may analyze the format of the detected boundary line and detect as a method of finding the location where inclination meets in one place. For example, the boundary point having the biggest x value may be detected as a folding point.

The straight line point 401 and curve point 402 may be detected by deriving the longest straight line of among the straight lines connecting the boundary surface of the book. The point close to the folding point of the detected longest straight line may be detected as the straight line point 401, and the point most distanced from the folding point of the detected longest straight line may be detected as the curve point 402.

Exemplary operations of calculating an equation using the detected reference point are disclosed.

Figure 9:
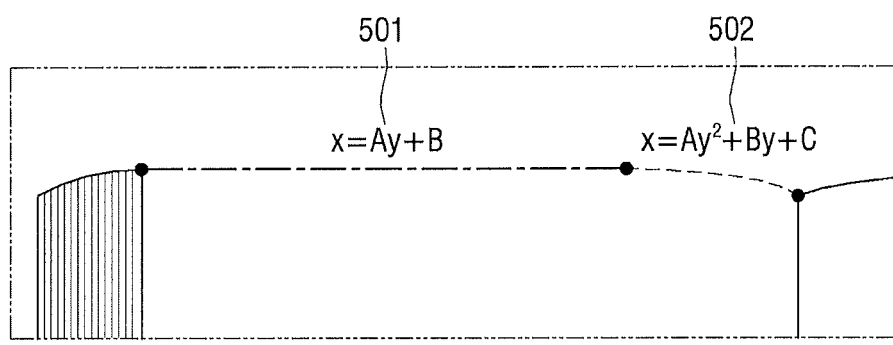
FIG. 9 illustrates an operation of producing an equation according to the exemplary embodiment of the present invention.

FIG. 9 illustrates operations for calculating an equation according to an exemplary embodiment.

With reference to FIG. 9, in an exemplary embodiment, a one-dimensional equation (XLINE) and a two-dimensional equation (XCURVE) calculated regarding the top end or bottom boundary surface of the book as the mathematical formula 1.

$$X_{LINE}=A_{LINE}*y_{LINE}+B_{LINE}$$

$$X_{CURVE}=A_{CURVE}*y_{CURVE}^2+B_{CURVE}*y_{CURVE}+C_{CURVE}$$ [Mathematical formula 1]

$X_{LINE}$ is an equation for the straight line section, $X_{CURVE}$ is an equation for the curve section, and A, B, C are constant values.

The coordinates of the straight line point 401 and curve point 402 may be used to calculate a one-dimensional equation. Since the method of calculating a one-dimensional using two coordinates is a general method, detailed explanation thereof is omitted.

It is possible to calculate a curve fitting based on the location of the boundary points located between the curve point 402 and the folding point 403 to calculate a two-dimensional equation. The method of calculating a two-dimensional equation using a curve fitting is a general method, and thus detailed explanation thereof is omitted.

Figure 10:
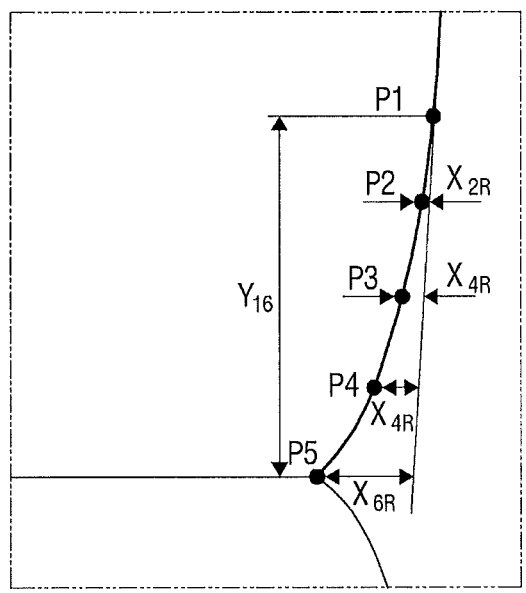
FIG. 10 illustrates a compensation operation regarding a distorted area according to the exemplary embodiment of the present invention.

An exemplary method of compensating distortion of the scan image using the equation derived as aforementioned with reference to FIG. 10 is disclosed.

FIG. 10 illustrates compensation operations for a distortion area according to the present exemplary embodiment.

With reference to FIG. 10, it is possible to calculate an x coordinate regarding each y coordinate location, using the calculated equation aforementioned. An x coordinate calculated as such is the degree of distortion in the corresponding y coordinate. Therefore, the image scanning apparatus 100 may perform compensation on the image of the corresponding y coordinate using the calculated x value. For example, in a P5 location, the image of the corresponding axis has a distortion of approximately $X_{6R}$. Therefore, the image scanning apparatus 100 may compensate by as much as $X_{6R}$ in a "−x" direction regarding each image pixel of the horizontal direction of P5. Such a compensation may be compensated in proportion to the location of an x-axis. That is, the location of P5 is the location having the most distortion, and thus regarding the corresponding location, it is possible to compensate as much as $X_{6R}$ in a "−x" axis direction, and as much as a size smaller than $X_{6R}$ regarding the next pixel.

Figure 11A:
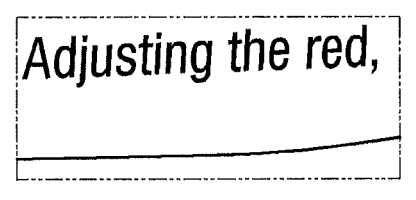
Figure 11B:
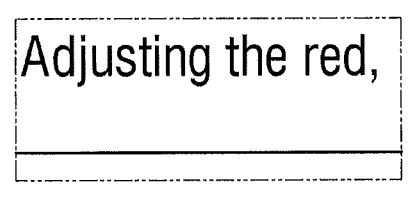

FIGS. 11A and 11B illustrate an image compensated according to an exemplary embodiment of the present invention.

FIGS. 11A and 11B illustrate an exemplary image compensated by such a process. FIG. 11A illustrates an image before distortion compensation, and FIG. 11B illustrates an exemplary image after distortion compensation. As illustrated in the present exemplary embodiment, it is possible to compensate the distortion regarding each location in detail using the equation.

According to an exemplary embodiment, two boundary sections may be defined using two equations. However, in a case of performing a S/W calculation or a H/W calculation using such an equation, it may be difficult to apply the coefficient of the aforementioned equation to the image due to a difference of resolution, and sometimes the coefficient may be a fractional value less than one, and thus the complexity of calculation may increase.

Accordingly, in the aforementioned compensating stage, the above mathematic formula 1 may be modified using a RATIO variation and a SHIFT variation. A RATIO variation may be used to map the folding point, curve point, and straight line point to be suitable to the resolution to be changed to. That is, in a case of being scanned twice to other resolutions, the coordinate of the equation detected to a low resolution may be converted into the coordinate of the image of the high resolution. A SHIFT variation may affect an adjusting of the size of the data so that the coefficient to be used in the equation of the curve and the equation of the straight line has a whole number.

$$X_{LINE}'=((A_{LINE}'*y_{LINE}')>>\text{SHIFT}\_A)+B_{LINE}'$$

$$X_{CURVE}'=(((A_{CURVE}'*(y_{CURVE}'-B_{CURVE}'))>>\text{SHIFT}\_B)*((y_{CURVE}'-B_{CURVE}')>>\text{SHIFT}\_C))>>\text{SHIFT}\_D$$ [Mathematical formula 2]

When using the equation calculated in the low resolution image regarding the high resolution image, it is possible to apply the mathematical formula modified as in the aforementioned formula 2.

Figure 12:
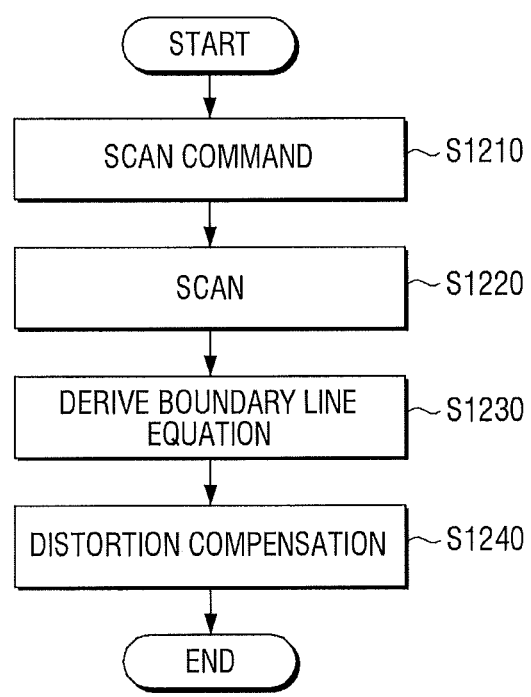
FIG. 12 illustrates a method of compensating an image according to an exemplary embodiment of the present invention.

FIG. 12 illustrates an exemplary method of compensating an image according to an exemplary embodiment of the present invention.

With reference to FIG. 12, when a scan command is input (S1210), scanning is performed on a manuscript to generate a scan image (S1220).

A manuscript boundary on the scan image is calculated as an equation (S1230). An exemplary method of calculating the equation is explained hereinbelow with reference to FIG. 13.

The distortion of the scan image is compensated using the calculated equation (S1240). It is possible to perform compensation using an equation corresponding to each area of which its distortion is to be compensated. A method of deciding the equation to be used per area is explained hereinbelow with reference to FIG. 16.

It is possible to store the compensated scan image, or transmit the compensated scan image to an external host apparatus, or print out the corresponding scan image.

A method for image compensation according to an exemplary embodiment may calculate the boundary of the manuscript in an equation, and use the calculated value to compensate the manuscript, performing a precise distortion compensation. In addition, by using the equation, it becomes unnecessary to store information on the boundary by much resource, thus reducing the memory of the image scanning apparatus 100. The image compensation method illustrated in FIG. 12 may be executed on the image scanning apparatus having the configuration of FIG. 1, or on the image scanning apparatus having other configurations.

The aforementioned image compensation method may be embodied as a program (or application) that includes an algorithm executable in a computer, and may be stored in a non-transitory computer readable medium and be provided.

The non-transitory computer readable medium refers to a computer readable medium where data may be stored semi-permanently such as a resistor, cache, and memory etc. The aforementioned various applications or programs the aforementioned various applications or programs may be stored in a non-transitory computer readable medium such as a CD, DVD, hard disk, blueray disk, USB, memory card, and ROM etc.

Figure 13:
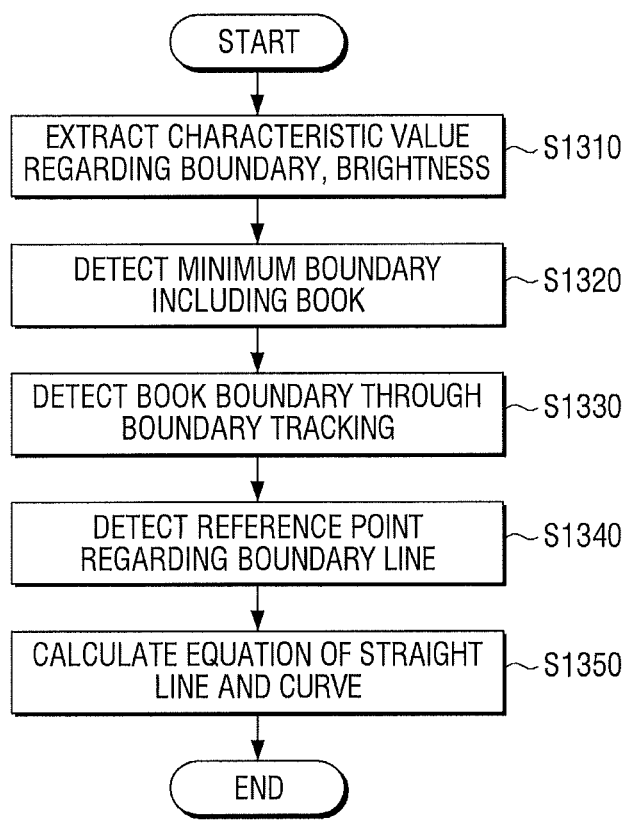
FIG. 13 illustrates an exemplary equation deriving stage.

FIG. 13 illustrates an exemplary equation deriving stage of FIG. 12.

With reference to FIG. 13, a characteristic value on the boundary and brightness is extracted (S1310). To detect the boundary in a pixel unit, a boundary image may be generated.

A minimum boundary area comprising a book is detected (S1320). To exclude inexact boundary detection that may occur due to various noise (for example, outside noise or lighting) located in a circumference area, a minimum boundary of a rectangular may be detected.

A book boundary through a boundary tract is detected (S1330). Exemplary operations of the book boundary are explained with reference to FIG. 14.

A standard point on a boundary line is detected (S1340). It is possible to analyze a format of the detected boundary line, detect a folding point in the method of finding the point where inclination meets, deriving the longest point of the straight lines connecting the boundary surface of the book, detecting a closest point to the folding point in the longest straight line as the straight line point, and detect the most distanced point from the folding point in the longest straight line detected as a curve point.

In An equation of a straight line and curve line regarding the boundary is calculated (S1350). A one-dimensional equation connecting a detected straight line and curve point, and a two-dimensional equation connecting a curve point and folding point may be calculated.

Figure 14:
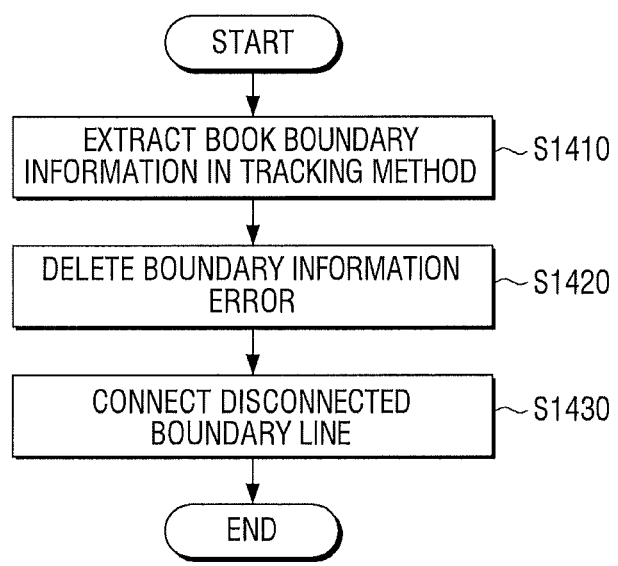
FIGS. 14 and 15 illustrate an exemplary book boundary detecting stage.
Figure 15:
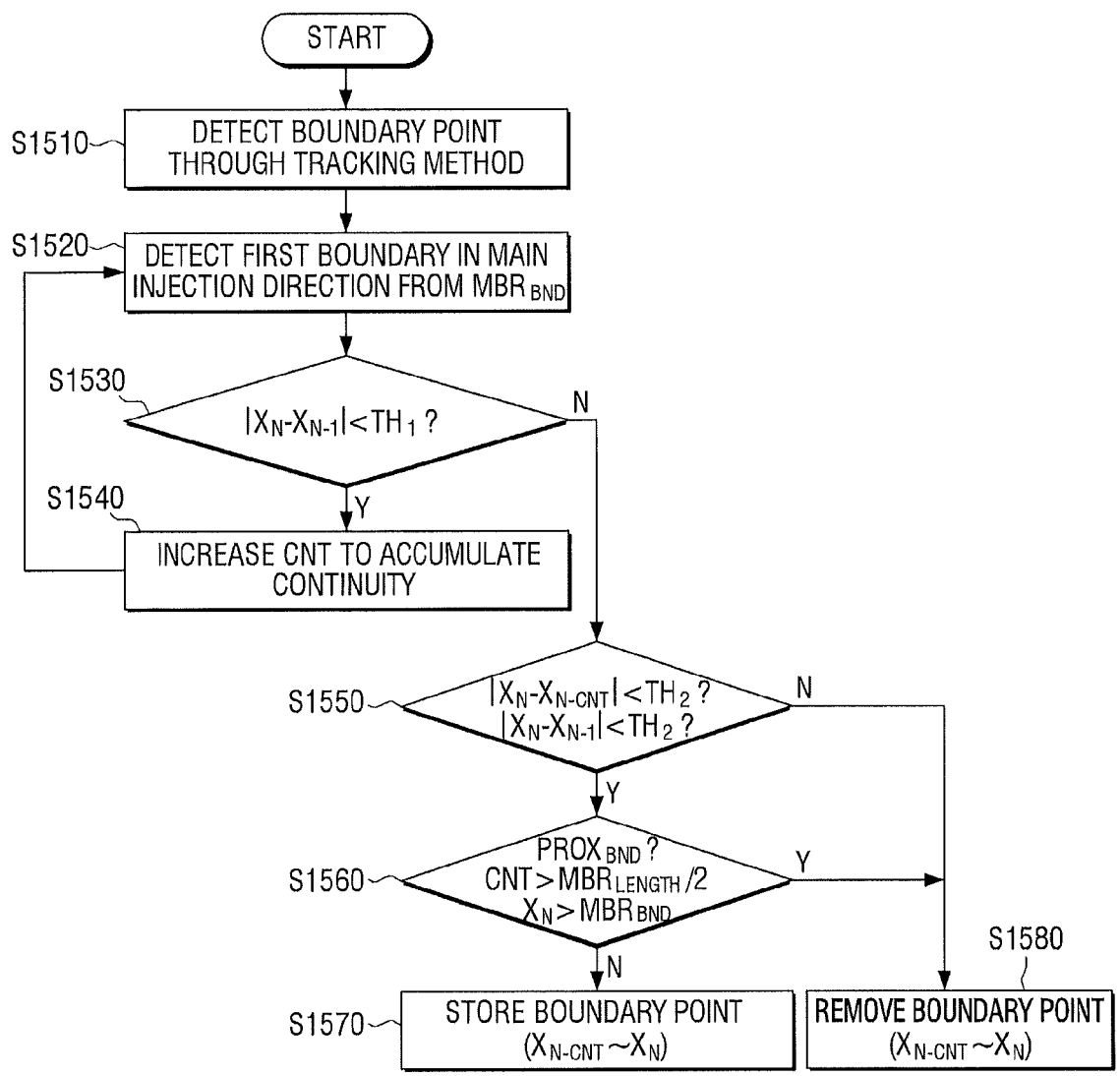

FIGS. 14 and 15 illustrate an exemplary book boundary detecting stage of FIG. 13.

With reference to FIG. 14, the book boundary information is extracted in a track method (S1410). The boundary candidate point between the document image area and circumference area is extracted while moving the book boundary information by a certain area in a y axis direction within the minimum boundary area.

An error point of among the extracted boundary candidate point is deleted (S1420). A adjacent boundary candidate point may be used to search the error point located within the document image area, and delete the searched error point in the plurality of boundary candidate points.

As disconnected boundary line is connected (S1430). It is possible to generate a boundary by connecting the area where the boundary point does not exist to the adjacent boundary candidate point by removing an error point.

The disconnected boundary line is connected (S1430). It is possible to connect the area where the boundary point does not exist to the adjacent boundary candidate point and generate a boundary by removing an error point.

Although, the removal of an error point has been described after the boundary candidate points are all detected, detecting the boundary candidate point and removing the error point may be performed in real time. Such an exemplary embodiment is explained with reference to FIG. 15.

With reference to FIG. 15, in an x direction within a minimum boundary that includes a book, searching starts (S1510). The boundary first met in the search process may be designated as the boundary line candidate (that is, boundary candidate point) (S1520). Herein, $MBR_{BND}$ refers to the minimum boundary including the book, $X_N$ is the Nth detected x coordinate, and CNT is the count of the continuously accumulated X.

A verification regarding the detected boundary candidate point is performed (S1520). It is possible to determine whether the distance between the detected boundary candidate point and the detected boundary candidate point is less than the predetermined value.

As a result of determination, when a value is less than the predetermined first value (S1530—Y), the detected candidate point is stored as a boundary point, and the CNT is increased to perform searching regarding the next boundary candidate point. (S1540).

When a value is greater than, or equal to, the first value (S1530—N), it is verified whether the distance between the x coordinate is uniform, and whether the piece of the connected x is in an inappropriate location (S1550, S1560). It is determined whether a difference between the initially detected boundary point and the current detected boundary candidate point is less than the predetermined second value, and whether the difference between the detected boundary candidate point and the boundary point just detected is less than the predetermined second value (S1550), and when the two differences are both less than the predetermined second value, it is determined whether the current detected location is a minimum boundary candidate (S1560).

As a result of determination, when the two values are less than the second value and within the minimum boundary (S1550—Y, S1560—N), the corresponding boundary candidate point is stored as the boundary point (S1570), and the CNT is increased to search the next boundary candidate point (S1540).

However, when the two values are larger than the second value, or outside the minimum boundary (S1550—N, S1560—Y), the corresponding boundary candidate point is removed (S1580).

Figure 16:
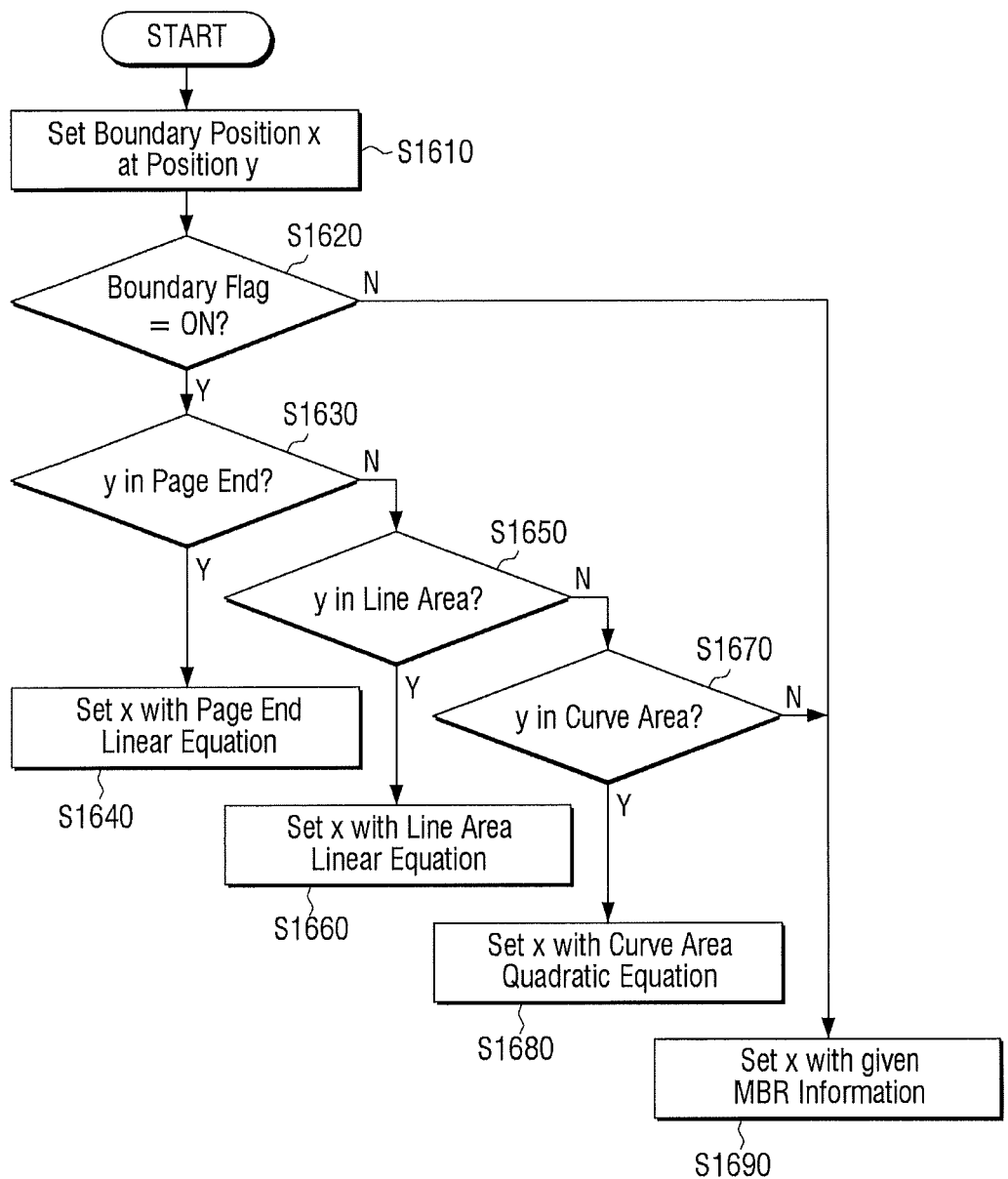
FIG. 16 illustrates an exemplary basis for selecting a mathematical formula needed to predict a boundary point in a distortion compensator.
Figure 17:
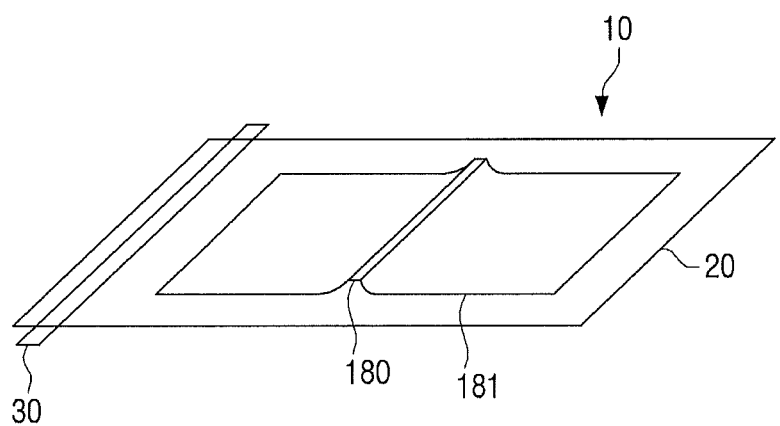
FIGS. 17 and 18 illustrate exemplary problems of a conventional image scanning apparatus.
Figure 18:
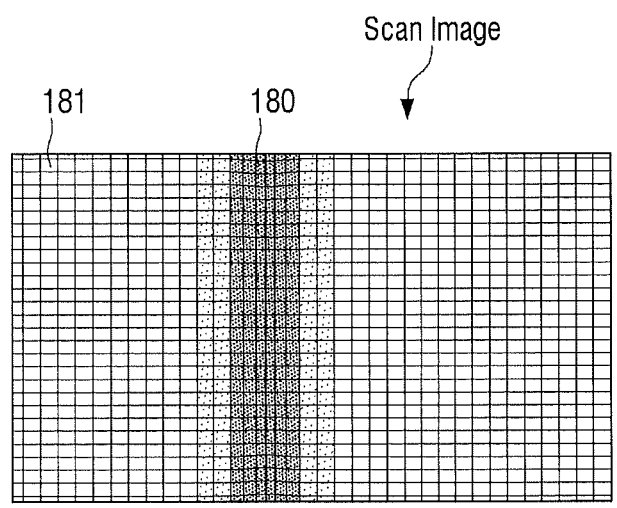

FIG. 16 illustrates an exemplary standard for selecting the mathematical formula necessary when predicting the boundary point in the distortion compensator.

With reference to FIG. 16, a boundary location is determined (S1610), and it is determined whether there is sufficient boundary information (S1620).

When the boundary information is not sufficient (S1620—N), an exception processing of having only the minimum boundary including the book to be removed is performed (S1690).

When the boundary information is sufficient (S1620—Y), it is determined whether "y" is located in the page starting location (S1630).

When "y" is located in the page start location (S1630—Y), the boundary point is predicted using a straight line equation (S1650).

As a result of determination, when "y" is at a location where it is possible to use the straight line equation (S1650—Y), the boundary point is predicted using the straight line equation.

As a result of determination, when "y" is in a location where it is not possible to use the straight line equation (S1650—N), it is determined whether "y" is a curve area, that is a location where it is possible to use a curve equation (S1670).

As a result of determination, when "y" is in a location where it is possible to use the curve equation (S1670—Y), the boundary point is predicted using the curve equation (S1680).

On the other hand, when "y" is not in a location where it is possible to use the curve equation (S1670—N), it is determined to have gone beyond the minimum boundary area (S1690).

Although a few embodiments of the present invention have been shown and described, it would be appreciated by those skilled in the art that changes may be made in this embodi-

What is claimed is:

1. An image scanning apparatus comprising:
a scanner that scans a manuscript and generates a scan image;
an image processor that calculates a manuscript boundary on the generated scan image as an equation, and compensates a distortion of the scan image using the calculated equation; and
a storage member that stores the scan image of which its distortion has been compensated,
wherein the equation comprises a multi-dimension equation that connects a curve point and a folding point.

2. The image scanning apparatus according to claim 1,
wherein the image processor comprises a boundary line determiner that detects a boundary between a document image area and circumference area within the generated scan image;
an equation calculator that calculates an equation regarding the detected boundary; and
a distortion compensator that compensates the distortion of the scan image using the calculated equation.

3. The image scanning apparatus according to claim 2,
wherein the boundary line determiner detects a minimum boundary area comprising the document image using brightness information of the generated scan image, and detects the boundary within the detected minimum boundary area.

4. The image scanning apparatus according to claim 2,
wherein the boundary line determiner extracts a plurality of boundary candidate points located between the document image area and circumference area, and connects the extracted plurality of boundary candidate points to generate a boundary.

5. The image scanning apparatus according to claim 4,
wherein the boundary line determiner searches an error point using an adjacent boundary candidate point of among the plurality of boundary candidate points, and connects the plurality of boundary candidate points excluding the searches error point, to generate a boundary.

6. The image scanning apparatus according to claim 2,
wherein the image processor further comprises a reference point detector that detects a plurality of reference points located on the boundary.

7. The image scanning apparatus according to claim 6,
wherein the plurality of reference points comprise a straight line point that is a vertex of the manuscript, a folding point located on a folding line of the manuscript, and a curve point located between the straight line point and folding point.

8. The image scanning apparatus according to claim 7,
wherein the reference point detector analyzes a format of the boundary to detect a point where the boundary gathers as a folding point, and
detects a longest straight line of among the straight lines connecting the boundary, detects a point adjacent to the folding point on the detected straight line as a curve point, and detects a point most distanced from the folding point on the detected straight line as the straight line point.

9. The image scanning apparatus according to claim 7,
wherein the equation calculator calculates a one-dimensional equation that connects the straight line and curve point, and a multi-dimension equation that connects the one-dimensional equation, curve point, and folding point.

10. The image scanning apparatus according to claim 9,
wherein the multi-dimension equation is a two-dimensional equation.

11. The image scanning apparatus according to claim 9,
wherein the distortion compensator performs compensation regarding a distortion area defined by the calculated multi-dimension equation and the folding line crossing the scan image using the calculated multi-dimension equation.

12. The image scanning apparatus according to claim 2,
wherein the equation calculator calculates a plurality of equations regarding one boundary that meets perpendicularly to the folding line crossing the scan image.

13. The image scanning apparatus according to claim 2,
wherein the distortion compensator performs compensation of removing the circumference area using the detected boundary.

14. The image scanning apparatus according to claim 2,
wherein the boundary line determiner detects the folding line crossing the scan image, and
the distortion compensator separates the scan image of which its distortion has been compensated into a plurality of images based on the folding line.

15. The image scanning apparatus according to claim 1,
further comprising a controller that controls the scanner to generate a first scan image in a predetermined first resolution and a second scan image in a resolution higher than the first resolution, and
controls the image processor to calculate an equation using the first scan image, and to compensate the second scan image using the calculated equation.

16. The image scanning apparatus according to claim 1,
wherein the scanner comprises a stage glass where documents are accumulated; and
a scanning head that reciprocates in a lower part of the stage glass and scans the image of the document.

17. An image scanning apparatus comprising:
a scanner that scans a manuscript in a predetermined first resolution to generate a first scan image;
an image processor that calculates a manuscript boundary on the generated first scan image as an equation;
a controller that controls the scanner to scan the manuscript in a second resolution that is higher than the first resolution to generate a second scan image, and controls the image processor so that a distortion of the second scan image is compensated using the equation calculated through the first scan image; and
a storage member that stores the second scan image of which the distortion has been compensated.

18. An image compensation method of an image scanning apparatus, the method comprising:
scanning a manuscript to generate a scan image;
calculating a manuscript boundary on the generated scan image as an equation; and
compensating the distortion of the scan image using the calculated equation,
wherein the equation comprises a multi-dimension equation that connects a curve point and a folding point.

19. The image compensation method according to claim 18,
wherein the calculating comprises detecting a boundary between a document image area and a circumference area within the generated scan image;

detecting a plurality of reference points located on the boundary; and calculating an equation regarding the detected boundary using the detected plurality of reference points.

20. The image compensation method according to claim 19, wherein the calculating further comprises detecting a minimum boundary area comprising a document image area using brightness information of the generated scan image;

and the detecting the boundary detects the boundary within the detected minimum boundary area.

21. The image compensation method according to claim 19, wherein the plurality of reference points comprise a straight line point that is a vertex of the manuscript, a folding point located on a folding line of the manuscript, and a curve point located between the straight line point and the folding point.

22. The image compensation method according to claim 21, wherein the calculating comprises calculating a one-dimensional equation that connects the straight line point and the curve point and a multi-dimension equation that connects the curve point and folding point.

23. The image compensation method according to claim 22, wherein the compensating the distortion performs compensation using the calculated multi-dimension equation, regarding a distortion area defined by the calculated multi-dimension equation and folding line crossing the scan image.

24. An image compensation method of an image scanning apparatus, the method comprising:

scanning a manuscript in a predetermined first resolution to generate a first scan image;

calculating a manuscript boundary on the generated first scan image as an equation;

scanning the manuscript in a second resolution that is higher than the first resolution to generate a second scan image;

compensating a distortion of the second san image using the equation calculated through the first scan image; and storing the second scan image of which the distortion has been compensated.

* * * * *